(12) United States Patent
Torkian et al.

(10) Patent No.: US 11,494,717 B2
(45) Date of Patent: Nov. 8, 2022

(54) SYSTEM AND METHOD FOR SUPPLY CHAIN MANAGEMENT

(71) Applicant: Elemica, Inc., Wayne, PA (US)

(72) Inventors: Behzad Torkian, Atlanta, GA (US); Armand Castro, III, Atlanta, GA (US); Daniel Grant, Atlanta, GA (US)

(73) Assignee: ELEMICA, INC., Wayne, PA (US)

( * ) Notice: Subject to any disclaimer, the term of this patent is extended or adjusted under 35 U.S.C. 154(b) by 1449 days.

(21) Appl. No.: 15/617,718

(22) Filed: Jun. 8, 2017

(65) Prior Publication Data

US 2018/0357585 A1 Dec. 13, 2018

(51) Int. Cl.
*G06Q 10/06* (2012.01)
*G06Q 10/08* (2012.01)

(52) U.S. Cl.
CPC ....... *G06Q 10/06315* (2013.01); *G06Q 10/08* (2013.01)

(58) Field of Classification Search
CPC ... G06Q 10/06; G06Q 10/06315; G06Q 10/08
USPC ....................................................... 705/7.25
See application file for complete search history.

(56) References Cited

U.S. PATENT DOCUMENTS

| | | | |
|---|---|---|---|
| 7,529,695 B2 | 5/2009 | Yang et al. | |
| 7,624,078 B2 | 11/2009 | Dietrich, Jr. et al. | |
| 8,428,985 B1 | 4/2013 | Puskorius et al. | |
| 8,732,023 B2 | 5/2014 | Mikurak | |
| 8,800,020 B1 | 8/2014 | Dale et al. | |
| 8,867,718 B2 | 10/2014 | Gilles | |
| 8,904,528 B2 | 12/2014 | Dale et al. | |
| 9,159,046 B2 | 10/2015 | Kerschbaum | |
| 9,224,135 B2 | 12/2015 | Dale et al. | |
| D764,496 S | 8/2016 | Salazar Cardozo et al. | |
| D766,958 S | 9/2016 | Salazar Cardozo et al. | |
| 9,443,229 B2 | 9/2016 | Torkian et al. | |
| D769,899 S | 10/2016 | Salazar Cardozo et al. | |
| 2002/0143855 A1* | 10/2002 | Traversat | G06F 9/544 709/213 |
| 2002/0165747 A1 | 11/2002 | Shriver et al. | |

(Continued)

OTHER PUBLICATIONS

IBM tunes message broker for B2B. Gonsalves, Antone. PC Week: 16. Ziff Davis Enterprise. (Mar. 20, 2000).*

(Continued)

*Primary Examiner* — Timothy Padot
(74) *Attorney, Agent, or Firm* — Panitch Schwarze Belisario & Nadel LLP

(57) ABSTRACT

A system for retrieving messages of a supply process in a supply chain and methods for making and using the same. The system may bind a message received from a player of the supply chain with existing related messages, build a binding message set based on bound messages and retrieve the messages based on the binding message set. Messages issued by the player may follow frameworks generated between the player and other players of the supply chain. In accordance to a specific framework, a message between two players may have a common data element and may follow rules proscribed within the framework. Global standards or common data elements is not required, thereby permitting each participant in the supply chain to transmit messages in their preferred format.

26 Claims, 11 Drawing Sheets

(56) References Cited

U.S. PATENT DOCUMENTS

| | | | |
|---|---|---|---|
| 2003/0236693 A1* | 12/2003 | Chen | G06Q 10/10 705/7.15 |
| 2005/0071207 A1 | 3/2005 | Clark et al. | |
| 2005/0240592 A1* | 10/2005 | Mamou | G06Q 10/10 707/999.009 |
| 2011/0125702 A1 | 5/2011 | Gorur Narayana Srinivasa et al. | |
| 2011/0145005 A1* | 6/2011 | Cao | G06Q 10/10 714/E11.178 |
| 2011/0161474 A1* | 6/2011 | Gannon | G06Q 30/02 709/221 |
| 2013/0317929 A1* | 11/2013 | Schnorf | G06Q 30/08 705/26.3 |
| 2014/0279280 A1* | 9/2014 | Bennett | G06Q 20/401 705/26.82 |
| 2014/0282970 A1 | 9/2014 | Dale et al. | |
| 2014/0344211 A1 | 11/2014 | Allan et al. | |
| 2015/0186845 A1 | 7/2015 | Dale et al. | |
| 2015/0324397 A1 | 11/2015 | Bhatia et al. | |

OTHER PUBLICATIONS

A study on building of a common gateway for secure exchange and transmission of electronic business message. Chiu, Ruey-Kei; Shiao-Ping, Yu; S.C. Lenny Koh. Benchmarking 14.3: 306-319. Emerald Group Publishing Limited. (2007).*

* cited by examiner

SYSTEM AND METHOD FOR SUPPLY CHAIN MANAGEMENT

BACKGROUND OF THE INVENTION

Supply chain management, sometimes known as logistics management, comprises the management of the flow of goods and services from raw materials to the point of consumption. Supply chain management includes planning, implementing and controlling the efficient, effective forward and reverse flow and storage of goods, services and related information between the point of origin and the point of consumption in order to meet customer's requirements. This flow of goods, services and related information can be complicated and involve numerous participants who have minimal or no exposure to each other or understanding of the tasks each individual party is performing in the supply chain.

Supply chain logistics is a complex operation. In a general business sense, logistics is the management of the flow of messages between the point of origin and the point of consumption. Manufacturers, customers, shippers, carriers and other players or participants of the supply chain each have requirements and preferences regarding access to information and messages during the supply chain process, thus, it is difficult to implement unified data standard and data model among the plurality of players in the supply chain. For example, a unified keyword for identifying messages of a specific supply process is difficult, if not impossible, to implement, because, among other factors, of the competing interests and attention paid by various participants or players in the supply chain.

A goal of supply chain automation, or logistics automation, is to build a transaction model among players of the supply chain, which meets each player's expectations and can be followed by the players or participants of the supply chain process. Various solutions for supply chain automation are designed to help the supply chain industry in automating the workflow, as well as management of the system. Yet, because of the complexity of the supply chain, currently-available solutions do not satisfy the goal of supply chain automation and visibility.

An issue with many supply chain management systems is visibility afforded to all of the participants or players or at least the players or participants who desire visibility throughout the supply chain. When activity in the supply chain reaches its full potential, it becomes infeasible to model the transaction processes, because there is no intersection data element, such as common data element, between transactions in the supply chain network. It is not realistic to add new common data elements since the supply chain processes often involve many parties around the world, and thus, it is infeasible to build a unified automation model among the players for supporting proper visibility of the supply chain management.

The invisibility of the supply chain results in uncertainty to the customer or other supply chain participant, which is undesirable even when a minimal number of certain deliveries are impacted, because delivery of particular products may be extremely important for the customer's operations and/or for the operation of various other players or participants in the supply chain, such as for scheduling by carriers. For example, a customer may require a particular chemical compound from a manufacturer to operate their business. If the chemical compound does not arrive on time, the customer's business may be shut down until the compound does arrive. Such shut downs are exceptionally expensive and disruptive. In addition, late deliveries to carriers may disrupt the carrier's scheduling and can be expensive for the carrier and customer who absorbs increased fees from the carrier. Alternatively, if the product is food for the customer's vending machine, delays may be tolerable, as failure to refill the vending machine will not result in shut down of the customer's operations. With improved visibility of the shipment of products, good and services, the customer is able to adapt to potential cancellations or accept delays for shipments on low priority goods, services or products.

In currently-available systems, communications following confirmation of the order create were exclusively between a shipper and a manufacturer. That is, once an order was confirmed, the manufacturer handles shipment of the ordered product to the customer, typically through a third party shipper, and the shipper communicates exclusively with the manufacturer. Even if these communications were exchanged through a centralized supply chain management system, it is difficult to tie the message together and the customer had no access to the shipping status or exposure to potential problems with the shipment. The presently known systems, therefore, lack exposure to the shipping status of a product to a customer by tying communication messages together that relate to an order of the product.

In view of the foregoing reasons, it is desirable to have a system and method to maintain visibility of messages in a supply chain management system between the numerous participants to improve product and service visibility and timing.

BRIEF SUMMARY OF THE INVENTION

Aspects of the present disclosure relate to systems and techniques that may be used to manage and provide event visibility of a supply chain to users. Various aspects of the present disclosure may address techniques and methodologies of a method for managing messages of a supply process of the supply chain that has a plurality of players or participants. The method includes (a) binding a message received from a first player of the plurality of players of the supply chain, (b) building a binding message set based on the binding of step (a) and (c) retrieving the messages based on the binding message set of step (b). The message is sent from the first player to a second player in accordance with a framework agreed between the first and second players.

In some preferred embodiments of the disclosed methods, the binding of step (a) of the method includes receiving the message from the first player and binding the message with related messages existing in the supply chain, which includes searching for binding rules based on at least one of the first and second players, an intersection data element, a type of the received message or a combination thereof. Additionally, the binding of step (a) includes eliminating duplicate messages from the binding message set of step (b) and validating a message binding based on an existence of a message included in the message binding, wherein the message is other than the received message.

In some further preferred embodiments of the disclosed methods, the building the binding message set of step (b) includes constructing the binding message set based on message bindings between at least the first and second players and combining the message bindings, which includes performing union operations against message bindings existing in the supply chain. The step of managing the messages includes retrieving the messages selected from the binding message set.

According to some further aspects of the preferred embodiments, a method for managing messages of a supply chain process having a plurality of players in a supply chain with a system including a terminal and a central server is provided. The method includes (a) binding a message received from a first player of the plurality of players of the supply chain using the central server, (b) building a binding message set based on the binding of step (a) in the central server and (c) sending messages from the central server based on the binding message of step (b). The message is sent from the first player to a second player of the plurality of players through the central server in accordance with a framework agreed between the first and second players. The messages of step (c) may be displayed with the terminal.

Various aspects of the preferred embodiments may be exemplified in the form of hardware, software, firmware, and/or combinations thereof. In the case of software or firmware, a non-transitory machine-readable medium, such as memory (e.g., but not limited to, ROM, RAM, flash, disk, etc.), may be used to store data and/or executable instructions that may be executed by one or more processing devices.

BRIEF DESCRIPTION OF THE SEVERAL VIEWS OF THE DRAWINGS

The foregoing summary, as well as the following detailed description of the preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. Various aspects of this disclosure will now be discussed in further detail in conjunction with the attached drawings, in which.

Figure 1:
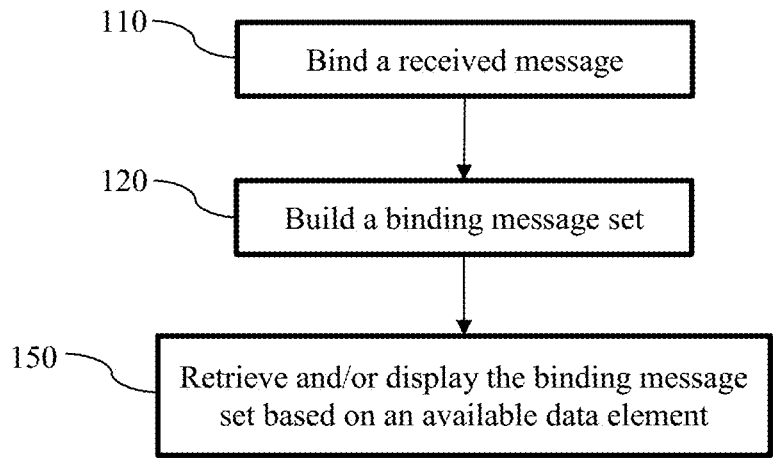
FIG. 1 is a flowchart diagram illustrating a supply chain process for managing a supply chain management system in accordance with a first preferred embodiment of the present invention.

It should be noted that the figures are not drawn to scale and that elements of familiar structures or functions are generally represented by like reference numerals for illustrative purpose throughout the figures. It also should be noted that the figures are only intended to facilitate the description of the various aspects of this disclosure and preferred embodiments of the present invention, and therefore, do not illustrate every aspect of this disclosure and do not limit the scope of this disclosure.

DETAILED DESCRIPTION OF THE INVENTION

Certain terminology is used in the following description for convenience only and is not limiting. Unless specifically set forth herein, the terms "a", "an" and "the" are not limited to one element but instead should be read as meaning "at least one". The words "right," "left," "lower" and "upper" designate directions in the drawings to which the reference is made. The words "inwardly" and "outwardly" refer to directions toward and away from, respectively, the geometric center of the products or processes described herein and designated parts thereof. The terminology includes the words above specifically mentioned, derivatives thereof and words of similar import.

It should also be understood that the terms "about," "approximately," "generally," "substantially" and like terms, used herein when referring to a dimension or characteristic of a component of the invention, indicate that the described dimension/characteristic is not a strict boundary or parameter and does not exclude minor variations therefrom that are functionally the same or similar, as would be understood by one having ordinary skill in the art. At a minimum, such references that include a numerical parameter would include variations that, using mathematical and industrial principles accepted in the art (e.g., rounding, measurement or other systematic errors, manufacturing tolerances, etc.), would not vary the least significant digit.

Currently-available supply chain management systems lack automation and visibility, particularly when activities of a supply chain reach a system's full potential, because there is no intersection data element between transactions in the supply chain network such that the different transactions involved in the supply chain can be tracked. Because of the disadvantages of currently-available supply chain management systems, a supply chain model that does not rely on an intersection data element or keyword element between transactions in the supply chain network may advantageously provide a desired solution. This result may be achieved, according to one aspect of this disclosure, by an example of a supply chain process 100 illustrated in FIG. 1.

Referring to FIG. 1, the supply chain process 100 is illustrated as binding a received message, building a message binding set and retrieving the binding message set based on an available data element. In FIG. 1, the message received may be bound, at 110, according to a predetermined framework between two partners in a supply chain. The message may be received, e.g., by a supply chain management system 250 (shown in FIG. 7), that is running the supply chain process 100.

The supply chain may be a system of organizations, people, activities information, and/or resources involved in ordering/moving a product or service from a supplier to a customer. The supply chain involves transactions of various types of messages among players, participants or partners of the supply chain, such as carriers, consignees, shippers, and related participants. The players can be located in very distributive settings both geographically and/or communicatively. Additional detail regarding the supply chain will be set forth with reference to FIGS. 7 and 9. Because of the distributive settings of the players, it is infeasible for every partner in a complex supply chain to follow a standard protocol, such as by implanting an intersection element in each message to facilitate tracking of the messages and the goods and/or services.

According to some aspects of this disclosure, a simple framework between two or more players or participants in the supply chain that may have a business relationship may be constructed and followed by the related players. The framework may define, but is not limited to, one or more intersection data elements between the players, such as an order number, a sales order number, a delivery note number, a shipping number, a transaction number, a line number, an invoice number or the like, depending upon a message type.

The intersection data elements may be, e.g., a common data element or a logic path. The logic path may be a relationship or a function of one or more elements, e.g., the function may be $F(x)=y$, where F is a function with an input x from a first transaction, y is an output of the function of a second transaction. The first and second transactions may be bound with the x and y via the function $F(x)=y$. In some embodiments, the function $F(x)$ may be $F(x)=x$, when $y=x$, i.e., the two transactions may have at least a common data element, e.g., F(po.order_create)=po.order.create*1=po.order.create. In some further embodiments, the x may be a substring of y, i.e., F(po.order.create)=company+po.order.create=po.order.respond, e.g., $F(\mathbf{124})$=company 124. In some further embodiments, y may be an increment number of x, i.e., F(transaction_id.order_create)=transaction_id.order_create+1=transaction_id.order_respond, e.g., $F(\mathbf{124})=\mathbf{125}$. In some further embodiments, the function $F(x)$ may be more complex. For example, the function $F(x)$ may be a conversion between two units, e.g., $F(kg)=kg*2.20462=lb$. Additionally and/or alternatively, the framework may include rules for related messages based on message types.

Figure 7:
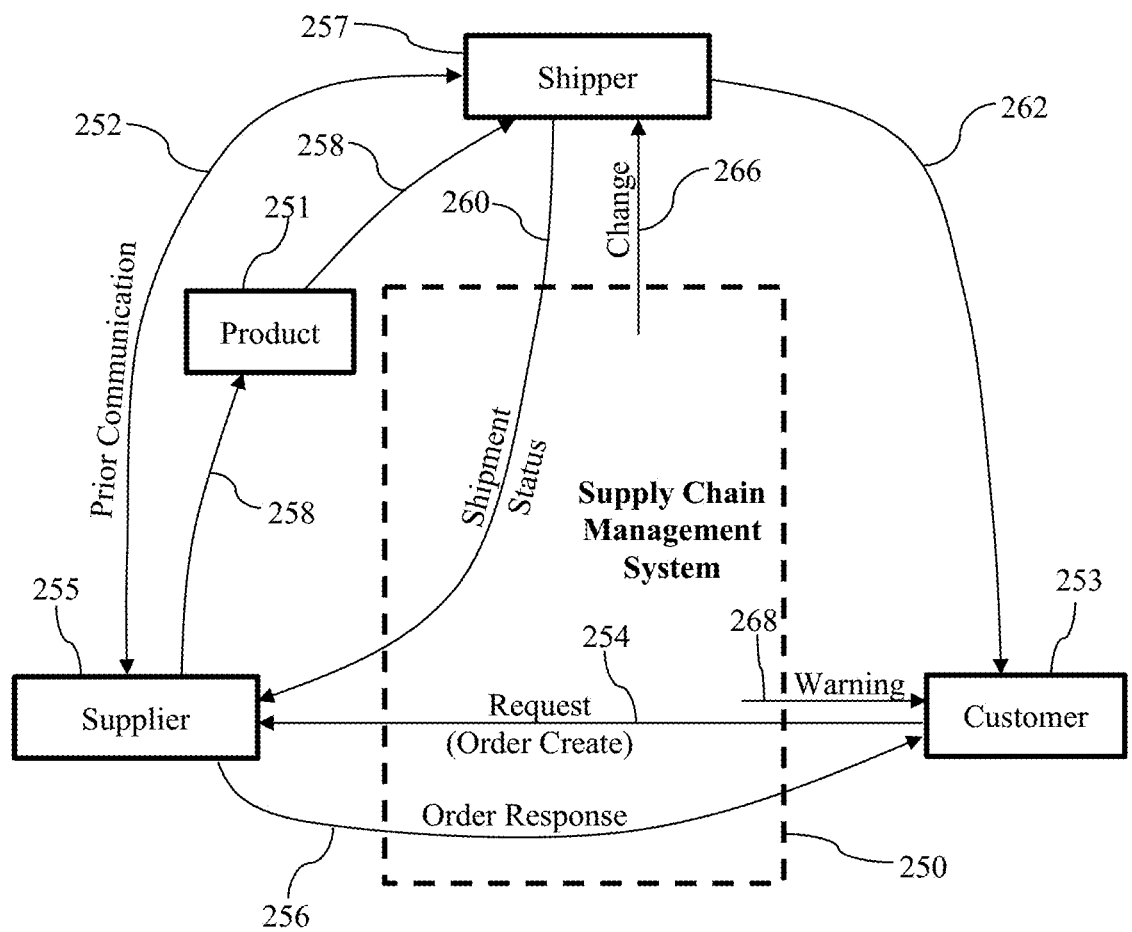
FIG. 7 is a block diagram illustrating a further example of the supply chain process of FIG. 1.

Referring to FIGS. 1 and 7, the framework for a specific player of the supply chain may be established according to business transactions of the player. When a first message from a first player to a second player of the supply chain is received by the supply chain management system 250, the message may include information required by the framework between the first player and the second player. The second player may send a second message either to the first player or to a third player of the supply chain. In a first case, the second message may include a first common data element, i.e., a function $F(x)=x*1$, with the first message, which may be used to bind the first message to the second message using the supply chain management system 250. In a second case, the second message may include a second common data element that may or may not be same as the first common data element. When the third player sends a third message to either the second player or to a fourth player of the supply chain, the third message may include a third common data element that may or may not be same as the second common data element. The third common data element may be used to bind the second message to the third message utilizing the supply chain management system 250.

Messages may be bound with an intersection data represented by $F(x)$, e.g., an order_response may bind with an order_create using a function F(OR.elementX)=OC.elementY. If the matching on a same PO, $F(x)=x*1=x$, i.e., a common data element. The binding function may be F(OR.PO)=OC.PO, which is valid when the function is valid. Based on a message type and the framework, the message may bind related messages existing in the system in a manner shown and described with reference to FIGS. 4-6 and FIGS. 9A-9E.

If no related message is found for a received message or if the received message is in a selected message type, the received message may be unbound until another related message is received. An example of the selected message type may be an order create ("OC") that is generally considered a start of an order in a supply process.

Referring to FIGS. 1 and 4-6, at 120, a binding message set may be generated to include all messages that are intersected together. In some embodiments, a message may be included in the binding message set when the message is bound with any one of the messages in the binding message set. For example, there are two message bindings, including order create and order response ("OR") {OC, OR} and order create and order change ("OChange") {OC, OChange}. As described herein, OC and OR may share a first common data element, and OC and OChange may share a second common data element that may be identical with or different from the first common data element. A binding message set {OC, OR, OChange} may be built when duplicated items are excluded from the binding message set. According to some aspects of preferred embodiments of the present invention, the binding message set may be generated or renewed dynamically when a received message is being bound. Alternatively, the binding message set may be generated based on a request to retrieve all transaction messages based on a keyword or a data element of a message.

The binding message set may be retrieved and/or displayed, at 150, based on one or more keywords or data elements of the bound messages, e.g., an order number, a tracking number, a shipment number or the like. Additionally and/or alternatively, the binding message set may be retrieved and/or displayed based on a message included in the binding message set. Although shown and described as being retrieved and/or displayed for purposes of illustration only, the binding message set may be utilized for other purposes, e.g., for managing or manipulating business messages.

In accordance with aspects of this disclosure, a player or participant of the supply chain may only need to maintain a limited number of frameworks with each partner who does business with the player, which is typically feasible and less cumbersome than following a standard protocol agreed by all players of the supply chain. Because an intersection data element may be required only within a framework, i.e., between two business partners, no intersection data element among all players of the supply chain is required.

Figure 2:
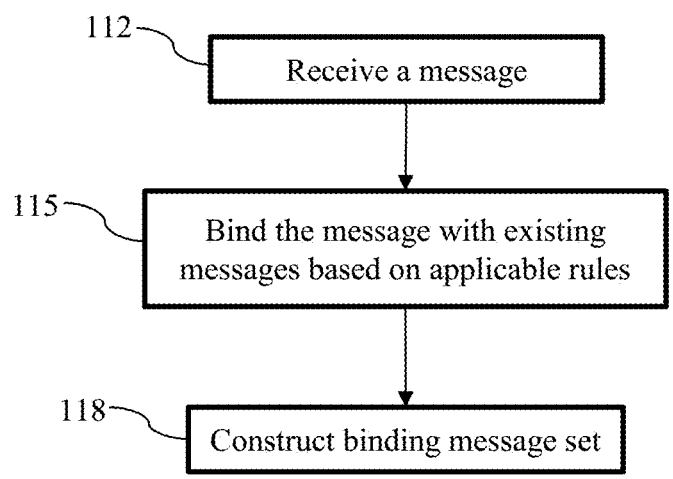
FIG. 2 is a flowchart diagram illustrating an example of the supply chain process of FIG. 1.

FIG. 2 shows a flowchart illustrating an example binding process that may be related to the supply chain process 100 of the preferred embodiment. Referring to FIGS. 2 and 7, a message may be received, at 112, by a supply chain management system 250. The message may be a transaction related message or message issued by a player of the supply chain. The message may have a message type including, but not limited to, the order create ("OC"), the order response ("OR"), the order change ("OChange"), a load tender motor ("LTM"), a load tender motor response ("LTR"), a shipping notice ("SN"), a shipping status ("SS"), an invoice ("IV"), an invoice response ("IR"), a payment detail ("PD") or the like. A player of the supply chain management system 250 may create one or more specific types of messages, e.g., a supplier may create an OC, an IV and the like, a carrier may create an SS and a shipper may create associated messages. The message may be a document or a record containing certain fields, including one or more keyword fields.

Referring to FIG. 2, at 115, the message may bind existing related messages based on applicable rules proscribed within a framework. The keyword field of the message may be used to search for the related messages existing in the supply chain management system 250 based on rules related to the player issuing the message. The rules may include, e.g., which type of message may bind the type of the received message and the like. Additional detail regarding binding the received message will be provided with reference to FIG. 3.

A binding message set including the received message may be constructed dynamically, at 118, while a related message is received. In case there is no existing related message found in the system, the received message may be a sole message included in the binding message set. When there are one or more existing related messages found in the system, the received message may be included in a message binding and the binding message sent along with the existing related messages.

Although shown and described as binding the message with existing related messages based on applicable rules for purposes of illustration only, other suitable binding approaches may be used in binding the received message with existing related messages.

Figure 3:
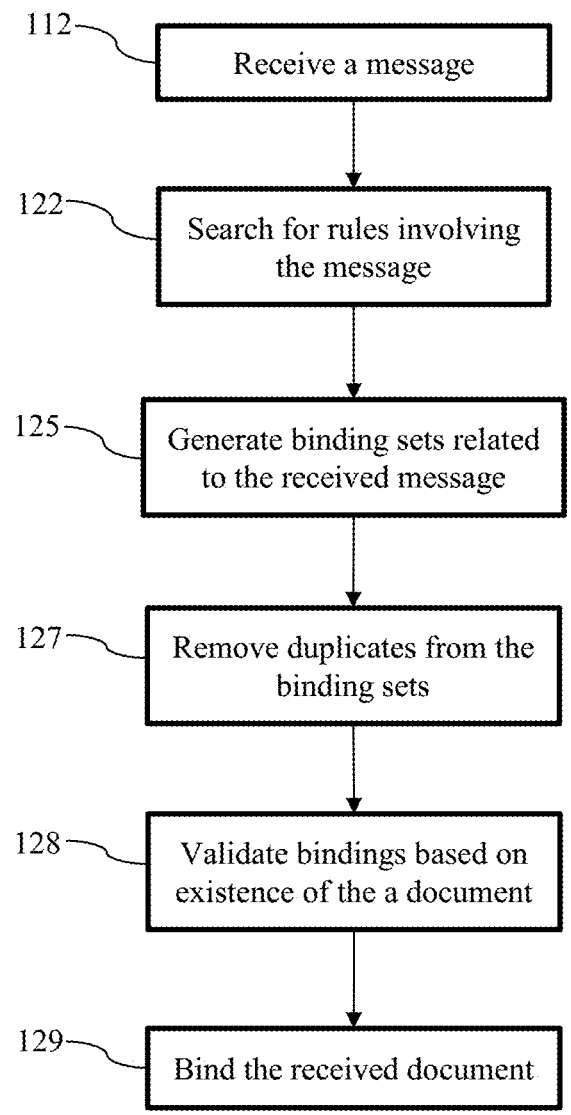
FIG. 3 is a flowchart diagram illustrating a further example of the supply chain process of FIG. 1.

Referring to FIG. 3, a further example of the supply chain process 100 is illustrated, which binds a received message with existing related messages. Referring to FIGS. 2, 3 and 7, the message may be received, at 112, from a first player of a supply chain. The message may be in a type described with reference to FIG. 2. The message may be created for and be sent to a second player of the supply chain in accordance to a framework between the first and second players.

At 122, binding rules including the type of message may be selected from a rule set proscribed in the framework between the first and second players. There may be more than one rule found including the type of message. Additional detail regarding selecting the binding rules will be provided with reference to FIGS. 4 and 5.

At 125, sets of binding rules including the received message type may be generated based on the selected binding rules. The sets of binding rules may include duplicates of message types because a message type may bind with multiple other message types. Accordingly, at 127, the message type duplicates may be eliminated from the selected binding rules. For example, if the selected binding rule before eliminating the duplicates is {OC, OC, OChange}, the duplicated OC may be eliminated from the binding rule set, and the binding rule set may become {OC, OChange}.

The bindings may be validated, at 128, to select the related messages existing in the supply chain based on the selected binding rules. For example, an OChange is received, there are two binding rules {OC, OChange} and {OR, OChange}, and only an OC exists, then, {OR, OChange} will be selected. Additional detail regarding selecting the binding rules will be provided with reference to FIGS. 4 and 5.

Although shown and described as performing the steps in an order of search for rules 122, generate binding sets 125, remove duplicates 127 and validate bindings 128 for purposes of illustration only, the steps 122, 125, 127 and 128 may be performed in any suitable order individually or collectively.

Figure 4:
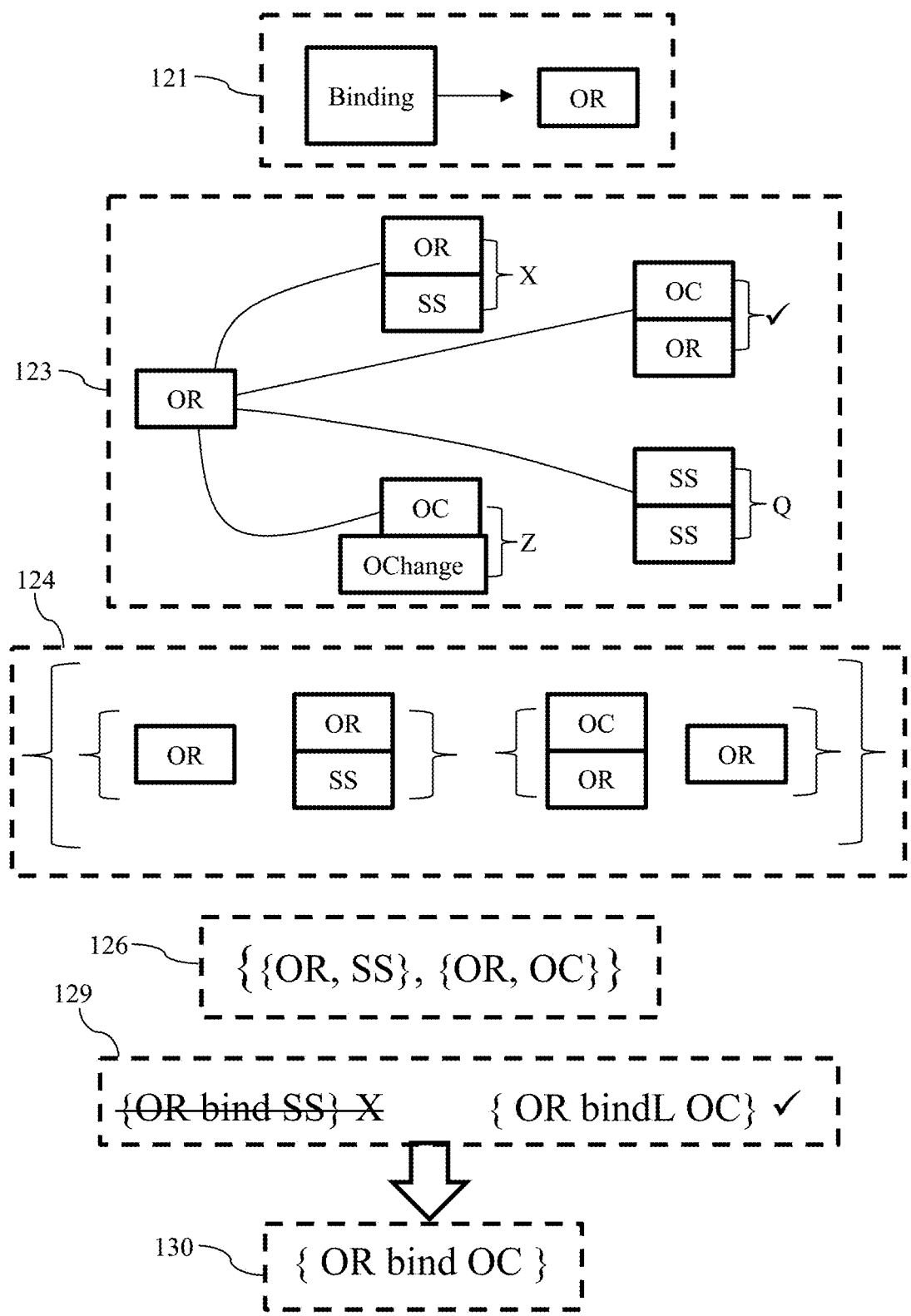
FIG. 4 is a block diagram illustrating an example of the supply chain process of FIG. 2.

FIG. 4 illustrates an exemplary binding process related to the supply chain process 100. In FIG. 4, an order response ("OR") message may be received, at 121, from a player of a supply chain for binding with existing messages. The player may be any participant in the supply chain, e.g., a shipper, a carrier, consignee or the like.

At 123, related binding rules may be retrieved based on the player and/or the type of the received message OR. In this case, a rule list of four binding rules may be retrieved based on the player that the OR is received from, i.e., {OR, SS}, {OC, OR}, {OC, OChange} and {SS, SS}. Not all of the rules include an OR message, therefore, those rules not including the OR may be eliminated, such as, {OC, OChange} and {SS, SS}. At 124, the OR message type may bind other message types based on the bindings that are left in the binding list, i.e., {OR, SS}, {OC, OR}, thus, a new binding list {OR, OR, SS}, {OR, OC, OR} may be acquired by combining the received message type into the binding lists. At 126, duplicates may be eliminated from the binding list and the rules left in the binding list may include non-duplicated bindings {OR, SS}, {OC, OR}.

Now the types of the bindings left in the binding list may be validated based on whether the message, other than the received message, included in a binding exists in the supply chain. For example, as illustrated at step 123, SS does not exist and OC exists. Accordingly, the binding {OR, SS} may be eliminated from the binding list, at 129, thus, only {OR bind OC} is included in the final binding list for the OR message.

Accordingly, at 130, the received OR message may bind the existing OC message according to the final binding list.

Figure 5:
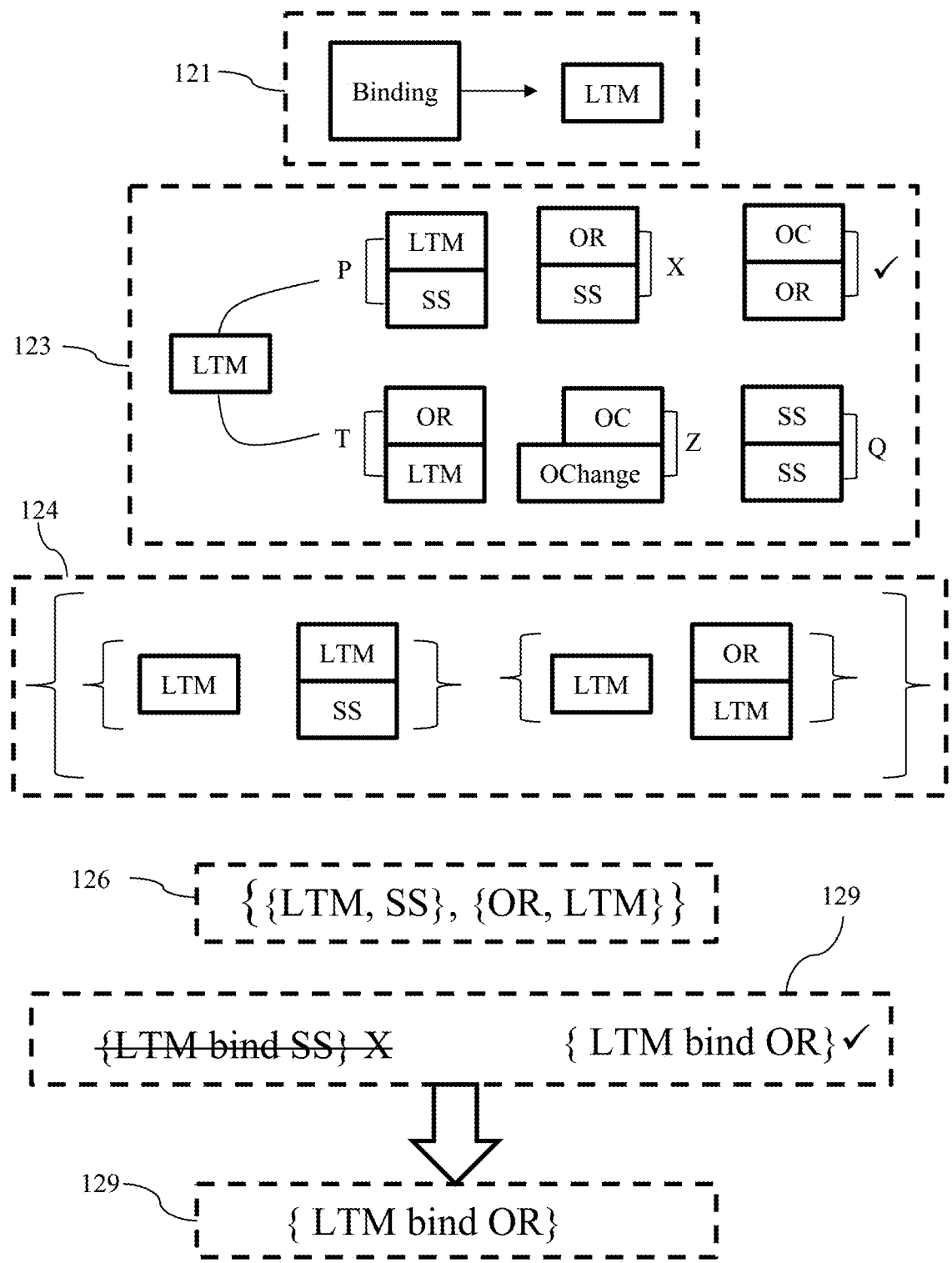
FIG. 5 is a block diagram illustrating a further example of the supply chain process of FIG. 2.

FIG. 5 illustrates a further exemplary binding process related to the supply chain process 100. In FIG. 5, a load tender motor ("LTM") message may be received, at 121, from a player of a supply chain for binding with existing messages. The player may be, e.g., a carrier.

At 123, related binding rules may be retrieved based on the player and/or the type of the received message, such as the LTM. In this case, a rule list of six binding rules may be retrieved based on the player that the LTM is received from, i.e., {{LTM, SS}, {OR, SS}}, {OC, OR}, {{OC, LTM}, {OC, OChange}} and {SS, SS}. Not all of the rules include a LTM message, therefore, those rules not including the LTM may be eliminated, such as, {OR, SS}, {OC, OR}, {OC, OChange} and {SS, SS}. At 124, the LTM message may bind other message types based on the bindings that are left in the binding list, i.e., {LTM, SS}, {OR, LTM} to acquire a new binding list {LTM, LTM, SS}, {LTM, OR, LTM} by combining the received message type into the binding lists. At 126, duplicates may be eliminated and the rules left in the rule list may include non-duplicated message types {LTM, SS}, {OR, LTM}.

Now, the types of the bindings left in the binding list may be validated based on whether the message, other than the received message, included in a binding exists in the supply chain. For example, as illustrated at step 123, SS does not exist and OR exists. Accordingly, the binding {LTM, SS} may be eliminated from the binding list, at 129, thus, only {LTM bind OR} is left in the final binding list for the LTM message.

Accordingly, at 130, the received LTM message may bind the existing OR message according to the final binding list.

Figure 6:
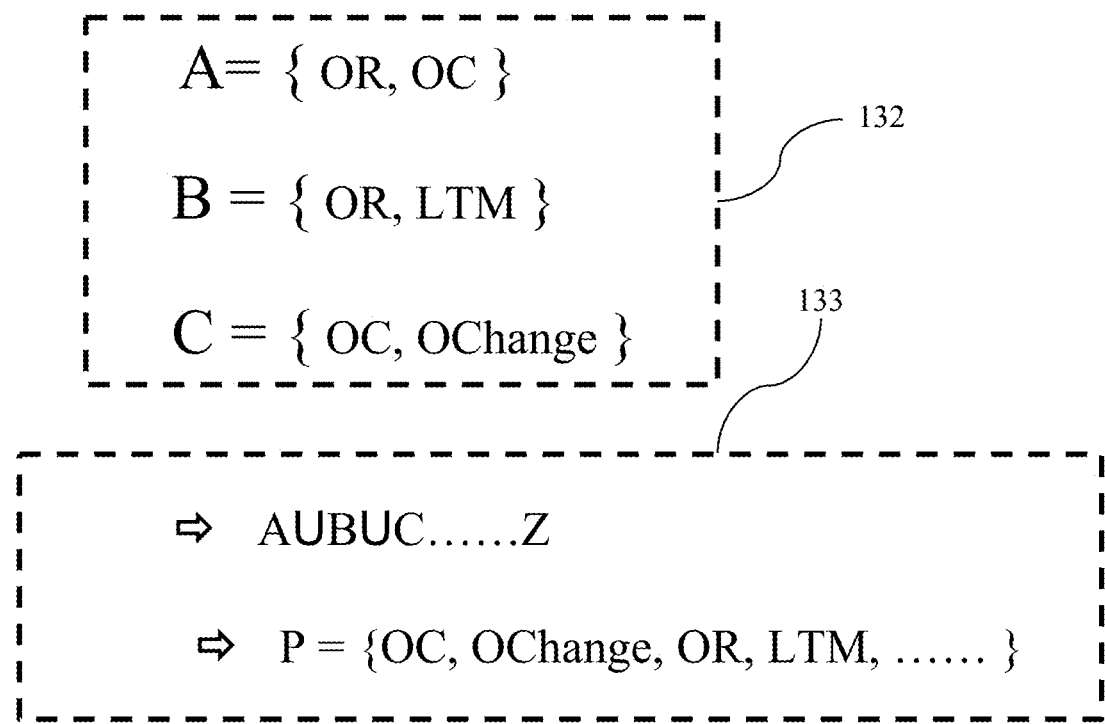
FIG. 6 is a block diagram illustrating a further example of the supply chain process of FIG. 2.

FIG. 6 shows an exemplary process of constructing a binding message set related to the supply chain process 100. Referring to FIGS. 6 and 7, at 132, three message bindings A, B, C are created, A={OR, OC}, B={OR, LTM} and C={OC, OChange} in the manners shown and described with reference to FIGS. 4 and 5.

A union operation may be performed upon the three message bindings A, B, C, at 133, to generate a binding message set, P. When the union operation is performed, duplicates may be eliminated from the binding message set. The result set P may be {OC, OChange, OR, LTM . . . }.

Although shown and described as including an OC, OChange, OR and LTM for purpose of illustration only, the binding message set may include any other suitable message types.

FIG. 7 shows an exemplary supply chain management system 200 for implementing the supply chain process 100. In FIG. 7, three exemplary players, i.e., a customer 253, a supplier 255 and a shipper 257, may be included in the supply chain management system 200. The shipper 257 and the supplier 255 may have engaged in a prior communication 252 for agreeing upon a framework that may be used between the shipper 257 and the supplier 255. The framework may include, but is not limited to, types of messages issued, keywords included in the messages, binding rules between the shipper 257 and the supplier 255 and the like.

The supplier 255 may be a provider of a product 258, e.g., a manufacturer, a dealer or a distributor of the product 258. In the supply chain, the supplier 255 may interact with the customer 253 and/or other players, e.g., the shipper 257, of the supply chain.

In use, the customer 253 may send a request, at 254, to the supplier 255 for ordering a predetermined quantity of product 251. The request may carry other information, including, but not limited to, a requested time for delivering the product 251. The request may be in a form of an OC in accordance to a framework defined between the customer 253 and the supplier 255. For a purpose of enforcing the framework, the customer 253 may use a user interface generated by the supplier 255 to create the order. The OC may include a common data element (or a common keyword) between the customer and the manufacturer, for e.g., the OC may include an order number and/or a line number assigned by the supplier 255 via the user interface. The OC may be a first message generated in a typical supply chain event.

Upon receiving the OC, the manufacturer may send an OR that may confirm, reject or modify the OC. Each of these communications may be performed by the supply chain management system 250 or may pass through the supply chain management system 250, thus, the OR and OC messages may be persisted in the supply chain management system 250. Exposure of the messages, e.g., OR and OC, may be accessed by the customer, the manufacturer and/or other authorized player of the supply chain management system 250.

The OR may also include common keywords in the framework with the customer 253, e.g., the OR may include the order number that is included in the OC. The OR may be bound with the OC in the supply chain management system 250 in a manner shown and described herein. Alternatively and/or additionally, the supply chain management system 250 may send a warning message to the customer 253, at 268, if the OC contains incompliance of the framework between the supplier 255 and the customer 253.

Before or after the OR, the supplier 255 may prepare the product ordered by the customer 253 and confirmed by the supplier 255, including selecting the product, packing the product, preparing an invoice, sending shipping messages and the like. The invoice and the shipping message may include a common data element, e.g., the order number, with the existing messages and may bind the OC and the OR according to the common data element. The supplier 255 may deliver the packed product to the shipper 257, at 251. Alternatively, the supplier 255 may get the product ready for the shipper 257 for picking up from the supplier 255. The shipper 257 may update shipping information via one or more messages, e.g., shipping status ("SS") 260 with the supply chain management system 250. The SS may be persisted with the supply chain management system 250 for exposing the SS to related players of the supply chain management system 250.

The order may be changed in the transactions of the order via a change message 266 from the supply chain management system 250. The change message 266 may be sent from the supply chain management system 250 to the shipper 257 and may be persisted in the supply chain management system 250.

The shipper 257 may arrange shipment of the product 251, e.g., packing the product 251 with other goods into a combined container. The other goods may be delivered by the same supplier 255 or by some other manufacturers. The product 251 may be assigned with another number for transportation purposes, for example, a tracking number. Shipping status 260 of the product 251 may be sent back to the supplier 255, which may be persisted in the supply chain management system 250. In accordance with the framework between the shipper 257 and the supplier 255, the SS may bind the OR or OC, which may be persisted in the supply chain management system 250. The product 251 may be transported to the customer 253 by various carriers (shown in FIG. 8), at 262.

Accordingly, the binding message set with the supply chain management system 250 may include {OC, OR, OChange, SN, SS, . . . IV}. When the customer 253 inquiries the status of the order, information selected from the binding message set may be presented to the customer 253.

Figure 8:
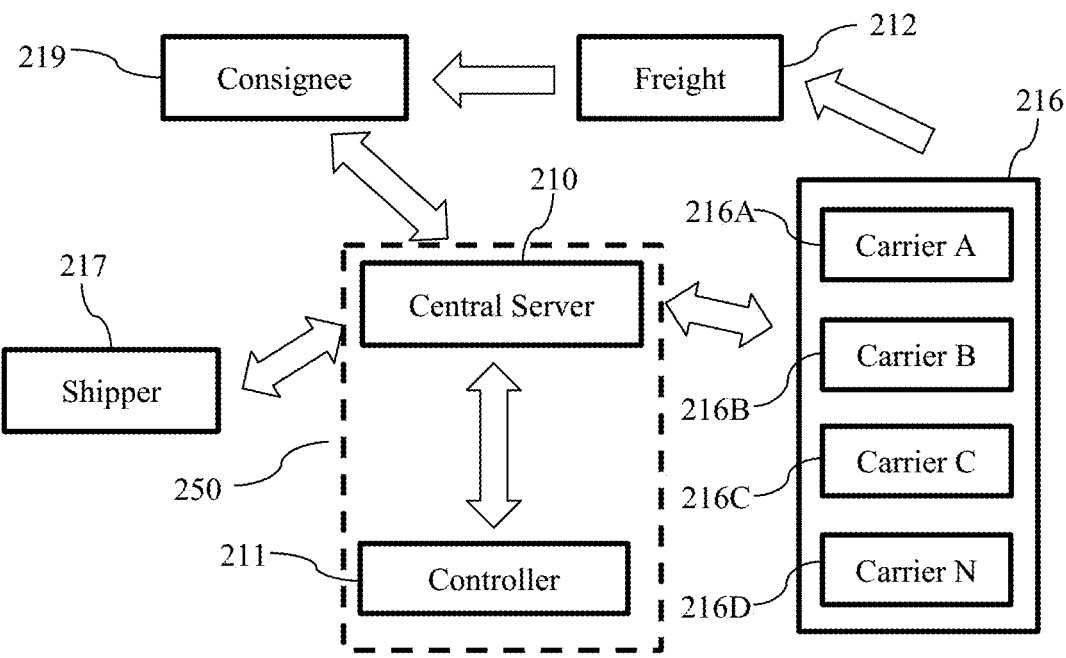
FIG. 8 is a block diagram illustrating a further example of the supply chain process of FIG. 1.

FIG. 8 illustrates an exemplary shipping system 200 implementing the supply chain process 100. In FIG. 8, a central server 210 may be provided that connects authorized players in the system 200. The central server 210 may be a computer program and/or a computing device for providing functional services to clients, i.e., other programs or devices, which may be disposed in any location and be directly or indirectly accessed by players of the shipping system 200.

A controller 211 may be communicatively connected with the central server 210. The controller 211 may be another computer program and/or a computing device for executing logic functions of the supply chain process 100. The controller 211 may receive messages sent from the players of the supply chain via the central server 210 and may perform the logics and functions shown and described with reference to the supply chain process 100.

The central server 210 may serve, e.g., a shipper 217, one or more carriers 216 and a consignee 219 or may alternatively serve numerous additional participants in the supply chain. As shown and described herein, the shipper 217 may be someone who sends goods for shipment, by packaging, labeling, and arranging for transit of goods and who may use multiple carriers 216A-216C for delivering a freight 212 that may include a product ordered by a customer to a consignee 219.

During a delivery process of the freight 212, the shipper 217 and the carriers 216 may exchange messages via and/or send messages to the shipping system 200. The messages may bind with existing related messages in a manner shown and described herein, thus, a player, e.g., the consignee 219, carriers 216, shipper 217 or other participants in the supply chain may access a shipping status of the freight 212 via accessing the shipping system 200.

Although shown and described as separating the central server 210 and the controller 211 for purposes of illustration only, the central server 210 and the controller 211 may be integrated into one computing device and/or one computer program.

Figure 9A:
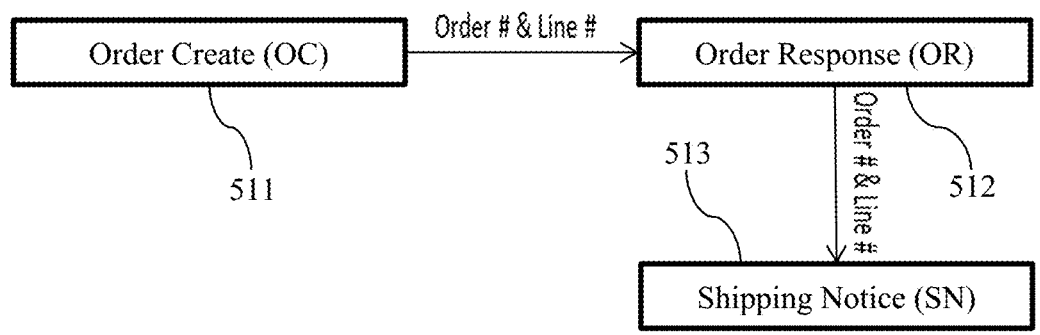
FIGS. 9A-9E are block diagrams illustrating further examples of the supply chain process of FIG. 1.

FIGS. 9A-9E illustrate example message bindings related to the supply chain process 100. In FIG. 9A, an OC 511 may be bound by an OR 512 with a common composite key (or common data element) such as "order number and line number" to generate a message binding {OC, OR}. In a transaction, one order may include multiple order items, each being assigned with a line number. The order number and the line number may be automatically assigned by a system, e.g., a system implementing the supply chain process 100, such that, each OC 511 and OR 512 may be uniquely identified by a combination of the order number and line number. Similarly, an SN 513 may bind with an OR 512 by the order number and line number to generate a message binding {OR, SN}. Accordingly, when messages related to an order item is searched based on the order number and the line number, the OC 511, OR 512 and SN 513 may be retrieved because they all carry the same values in the common composite key "order number and line number". Therefore, a binding set {OC, OR, SN . . . } may be virtually generated for each order item by the message bindings {OC, OR} and {OR, SN}.

Figure 9B:
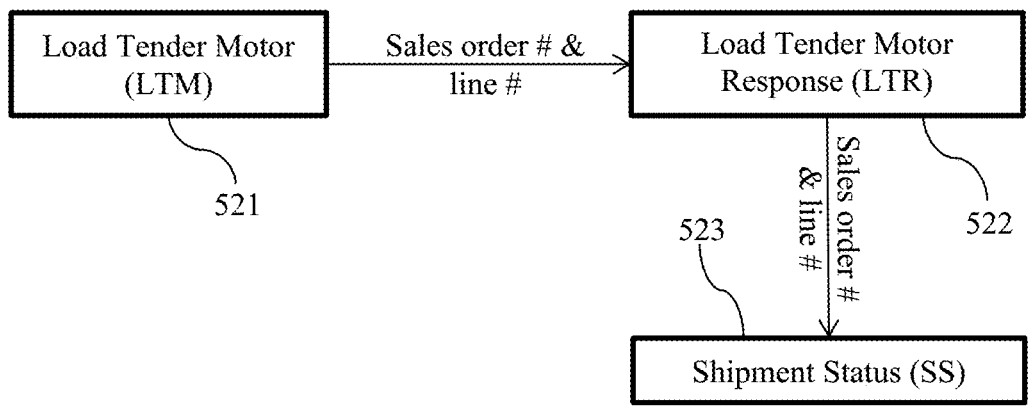

Different common composite key may be used to bind between various types of messages in a transaction. In FIG. 9B, for example, a LTM 521 may be bound with an LTR 522 that may bind with an SS 523 by the common composite key "sales order number and line number" to generate message bindings {LTM, LTR} and {LTR, SS}. Accordingly, when messages related to the order item is searched based on the sales order number and the line number, the LTM 521, LTR 522 and SS 523 may be retrieved and, thus, a binding set {LTM, LTR, SS . . . } may exist in the system via the message bindings.

Figure 9C:
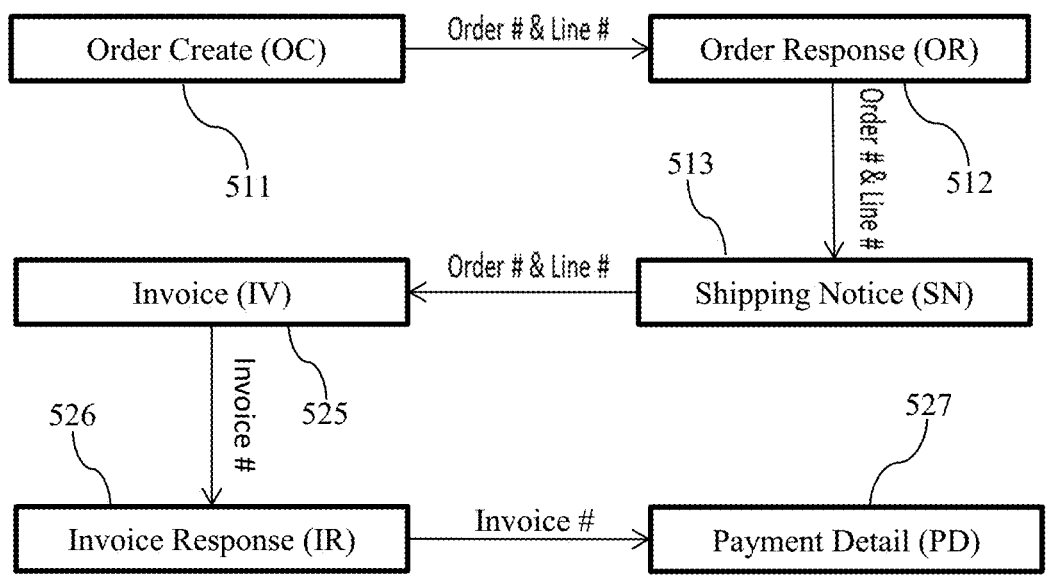

Messages related to an order item may carry different types of key and may still be retrieved by a common key that is related to the order item. In FIG. 9C, an OC 511, an OR 512 and an SN 513 may be bound by an order number and line number in message bindings {OC, OR} and {OR, SN}. When an IV 525 is entered into the system, e.g., in response to the SN 513, the IV 525 may bind with the SN 513 with the order number and line number to generate a message binding {SN, IV}. Additionally, the IV 525 may be assigned with a unique invoice number that may not exist in the SN 513, the OC 511 or the OR 512. When an IR 526 is created and entered in the system, e.g., in response to the IV 525, the IR 526 may bind the IV 525 by the invoice number to generate a message binding {IV, IR}. The order number and line number may not be included in the IR 526. Similarly, when a PD 527 is created, the PD 527 may bind with the IR 526 with the invoice number to generate a message binding {PD, IR}.

Accordingly, when messages related to the order item are searched based on the order number and the line number, the LTM 521, LTR 522, SS 523 and IV 525 may be retrieved. Additionally, the invoice number may be retrieved from the IV 525, which may be used to retrieve the IR 526 and PD 527. Similarly, when messages related to the order item is searched based on the invoice number, the IR 526, PD 527 and IV 525 may be retrieved; and the invoice number may be retrieved from the IV 525, which may be used to retrieve the LTM 521, LTR 522 and SS 523. Therefore, a binding set {OC, OR, SN, IV, IR, PD . . . } may be virtually generated by the message bindings for each order item.

Figure 9D:
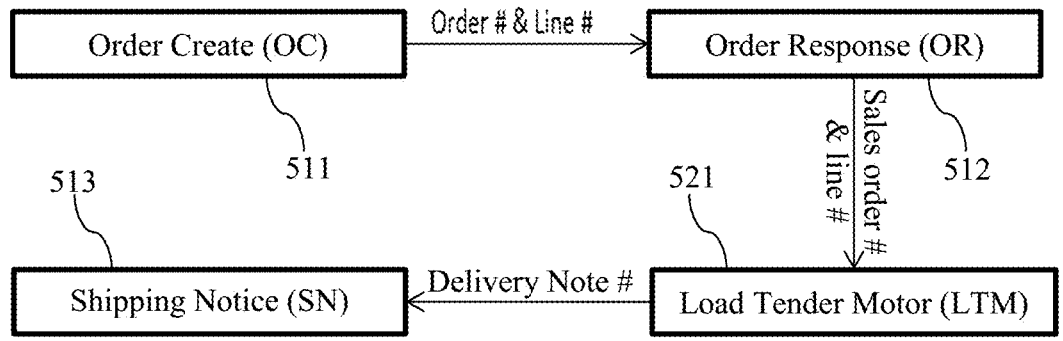

FIG. 9D shows a further example of message bindings using different keys. In FIG. 9D, an OC 511 and OR 512 for an order item may be bound by an order number and line number to generate a message binding {OC, OR}. The OR 512 may be bound with an LTM 521 by a sales order number and line number to generate a message binding {OR, LTM}. The LTM 521 may be bound with an SN 513 by a delivery note number to generate a message binding {LTM, SN}. Thus, the OR 512 may include a first key in the order number and line number and a second key in the sales order number and line number; the LTM 521 may include a first key in the order number and line number and a second key in the delivery note number. Accordingly, messages OC 511, OR 512, LTM 521 and SN 513 may be retrieved based on the order number and line number, the sales order number and line number and/or the delivery note number via the LTM 521 and, thereby, a binding set {OC, OR, LTM, SN . . . } may be virtually generated by the message bindings.

Figure 9E:
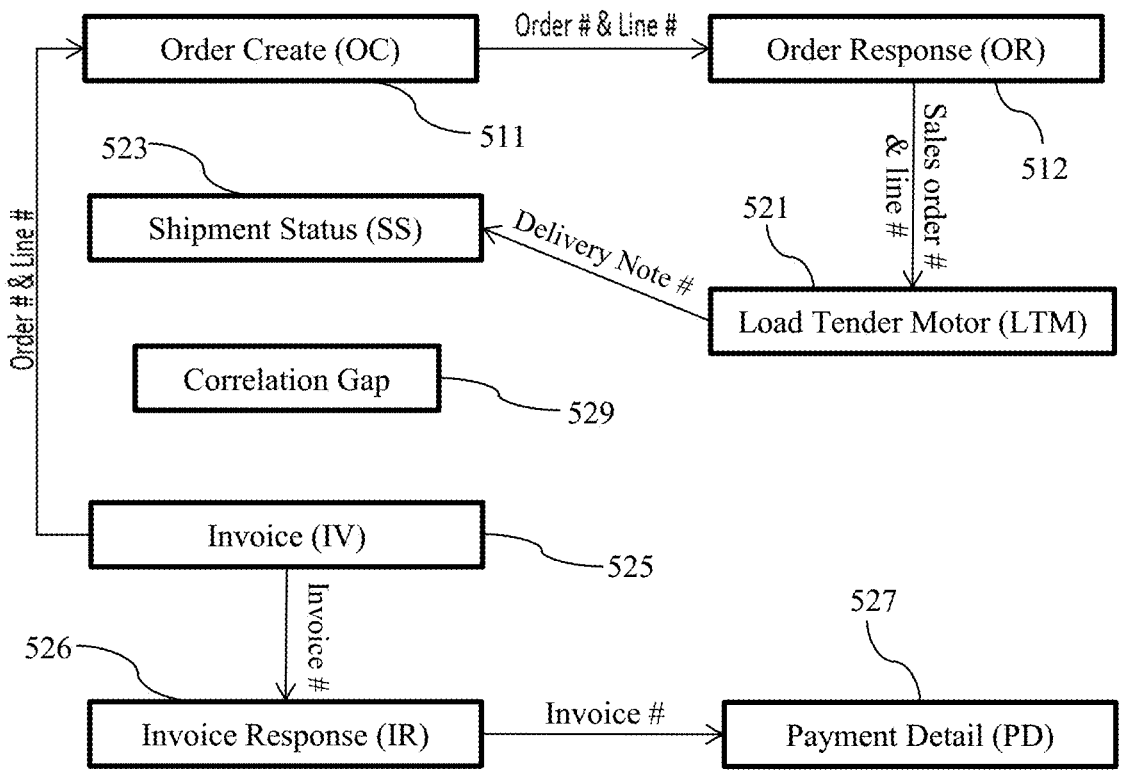

FIG. 9E shows a further scenario of message bindings using various common keys. In FIG. 9E, an OC 511 may be bound with an OR 512 by an order number and line number to generate a message binding {OC, OR}; the OR 512 may be bound with an LTM 521 by a sales order number and line number to generate a message binding {OR, LTM}, and the LTM 521 may bound with an SS 523 by a deliver note number to generate message binding {LTM, SS}. When an IV 525 is entered into the system, there may exist a correlation gap 529 between the SS 523 and the IV 525 because the SS 523 does not include the order number and line number. In this scenario, the IV 525 may bind with the OC 511 by the order number and line number to generate a message binding {OC, IV} because the IV 525 may be created e.g., in response to the OC 511. In addition to the order number and line number, the IV 525 may include an invoice number that may be used to bind a further message (s). For example, an IR 526 may bind with the IV 525 by the invoice number to generate a message binding {IV, IR}, and the IR 526 may be bound with a further message PD 527 by the invoice number to generate a message binding {IR, PD}.

Although shown and described as binding the IV 525 with the OC 511 when there is a correlation gap 529 for purposes of illustration only, a newly entered message, e.g., the IV 525, may bind with any other messages existing in the system and having a common key, e.g., the OR 512 with a common key in the "order number and line number" or the "sales order number and line number", or the LTM 521 with a common key in the "sales order number and line number" and the "delivery note number".

Accordingly, all OC 511, OR 512*f*, LTM 521, SS 523, IV 525, IV 526 and PD 527 may be retrieved based on either the order number and line number, the sales order number and line number, the delivery note number or the invoice number because common keys related to a specific order item may be retrieved. For example, when the order item is retrieved based on the order number and line number, corresponding order number and line number may be retrieved via the OR 512 and the delivery note number may be retrieved via the LTM 521, and the corresponding invoice number may be retrieved via the IV 525, thereby, all of the messages may be bound based on the corresponding common keys. Therefore, a binding set for the order item may be generated as {OC, OR, LTM, SS, IV, IR, PD . . . } based on the message bindings.

Although shown and described with binding the messages based on the corresponding common keys for purposes of illustration only, the messages may be bound based on other intersections, e.g., any logic paths.

Figure 10:
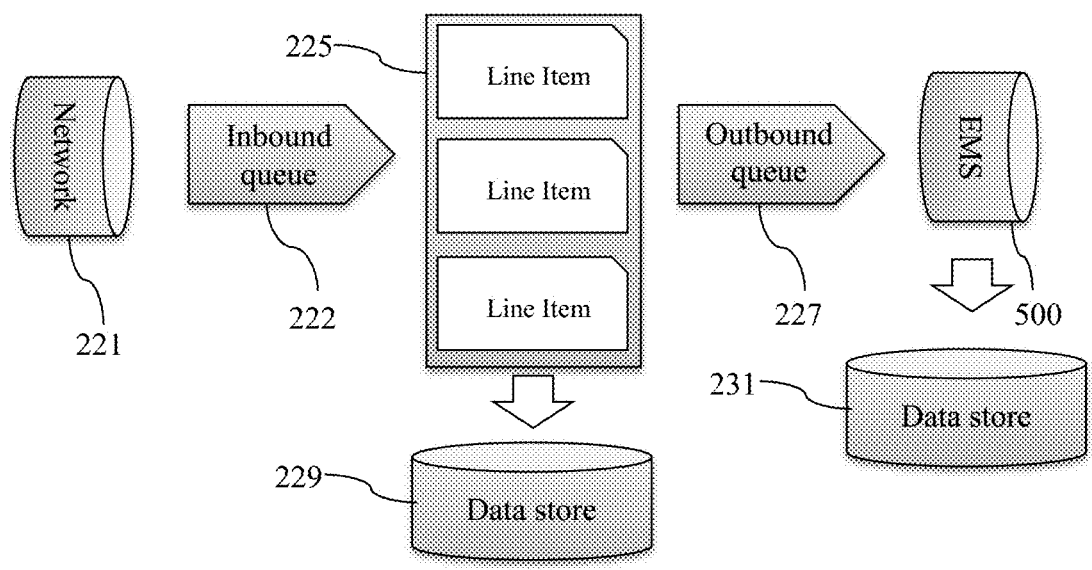
FIG. 10 is a block diagram illustrating a further example of the supply chain process of FIG. 1.

FIG. 10 illustrates an example of a message queue 300 related to the supply chain process 100. Referring to FIG. 10, a network 221 can be used as an intake of message batches that may be user business message ("UBD") batches and may be input via an input channel, e.g., an inbound queue 222.

Each of the message batches may be a batch message that may include a plurality of messages; each individual message may be processed as an individual line item 225. The batch message or the individual line items may be persisted into a data store 229. The batch message or the line items 225 may be pushed to a supply chain management system, e.g., an enterprise messaging system ("EMS") 500 (shown in FIG. 11) for processing, respectively, via an output channel, e.g., an outbound queue 227. The EMS 500 may persist the individual line items or any other data that are input or generated in processing the line items into the a data store 231.

The message queue 300 may serve as an intake buffer for the supply chain process 100. For example, when the supply chain process 100 does not have a capacity to catch up with the speed of the Summarist Ingress, the batch messages 225 can be buffered in the data store 229, so that no message batch may be lost before being processed by the supply chain process 100.

Although shown and described as using a network 221 for implementing the message queue for purposes of illustration only, other suitable communication systems may be used as message sources of the line items for the EMS system 500.

Figure 11:
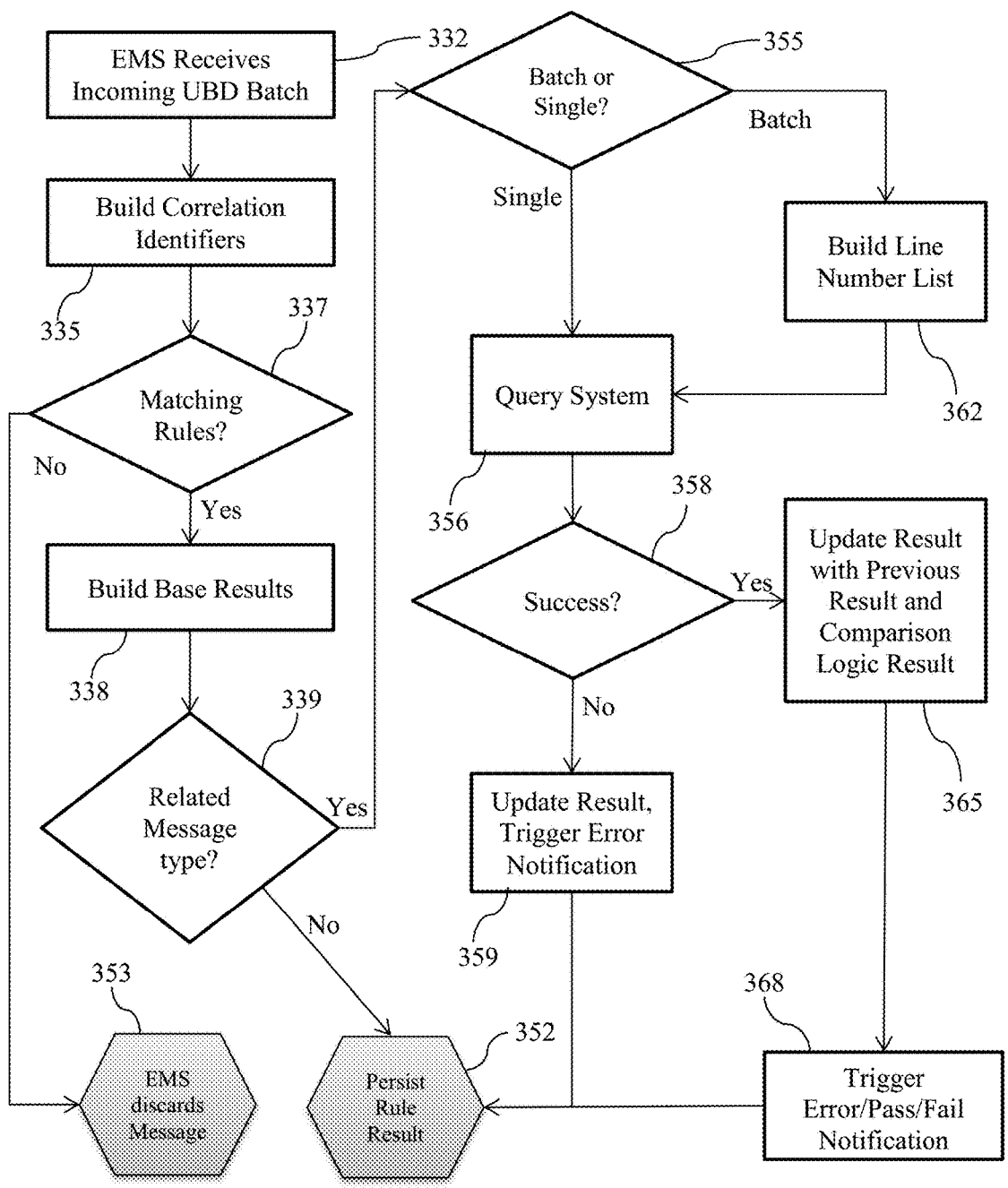
FIG. 11 is a flowchart diagram illustrating a further example of the supply chain process of FIG. 1.

FIGS. 10 and 11 illustrate an example of the supply chain process 100 being implemented with the EMS 500. Referring to FIGS. 10 and 11, the EMS 500 may receive the message batch, at 332. The message batch may be received from the message queue 300 (shown in FIG. 10) and may include a plurality of messages. The messages included in the batch may be from a single player of the supply chain process 100 and may include a single type of message.

At 335, the batch and/or the messages included in the message batch may be assigned with identifiers indicating a correlation with other messages existing in the supply chain management system 250. The identifiers may be a common data element constructed based on a type of the messages and/or a framework of the player who sends out the message batch. For example, an OR or an OChange may include an order number, an SS may include a shipping note number, and the like. Because the identifiers are assigned based on the frameworks, the identifiers may be used to bind the messages included in the message batch with related messages existing in the supply chain management system 250.

At 337, binding rules for the message batch may be matched based on the type of the messages included in the batch and the frameworks of the player that sends out the batch of messages. The binding rules may be used to bind the messages included in the batch with existing messages in the manners shown and described herein. If there is no matching rule found for the type of message and/or for the player, the message batch may be discarded, at 353, by the EMS and the process may be ended.

Additionally and/or alternatively, each business message may have an optional reference to a previously processed business message, which may chain certain related messages together. For example, when the matching binding rules being queried, at 337, related messages that are previously processed may be checked to determine whether a related message is identified as an event business message (a main message). If there exists such a related event business message, the current message may be chained with the event business message (the main message).

If one or more binding rules are found, at 337, base results of the binding rules may be built, at 338. The base results may include, e.g., all binding rules available for the player of the supply chain management system 250 or binding rules that are related to the messages of the batch. The base results may be, e.g., {OC, OR}, {OC, OChange}, {OC, LTM}, {SS, SS} and the like.

At 339, whether the existing binding rule is related to the type of the messages included in the message batch or whether there is a related message type can be determined by searching for binding rules that include the type of the messages in the message batch. If there is no such binding rule found, the binding rule set may be persisted, at 352. The binding rules may be saved for future use.

If at least one related binding rule is found, at 339, whether the message batch contains multiple messages may be determined, at 355. As shown and described herein, the message batch may include one or more messages generated by the player that sends the message batch. If the batch contains multiple messages, a line number list may be built, each corresponding to a message included in the batch, for the purpose of identifying each message in the batch. The individual messages contained in the message batch may be processed one by one (or line by line) through the EMS 500.

At 356, the supply chain management system 250 may query for existing messages related to the binding rules. Whether one or more messages are successfully retrieved may be determined, at 358. If one or more messages are successfully retrieved, a binding document set may be updated with the previous result of the binding document set and corresponding comparison logic result, at 365. The binding document set may be updated in a manner shown and described with reference to FIGS. 1-5. A notification may be sent to related player(s), at 368. Depending on a result of the update, the notification may be an error message, a pass notice or a failure notice.

If no message is retrieved based on the binding rules and/or the correlation identifiers, the result may be updated by creating a binding message set with only one message. An error notification may be triggered, at 359, to notify the player that no other related message is found for binding a respective message included in the batch.

In either case, the matching rule result of the message batch may be persisted in the DB for future use, at 352. The persisted binding rules may be retrieved, e.g., when the same player sends a batch with the same type of messages.

Although shown and described with the messages being sent from the sole player and the messages being comprised of a limited type of messages for purposes of illustration only, the supply chain management system 250 may process a batch with various types of messages and/or from different players of the supply chain management system 250.

Various aspects of the disclosure have been presented above. The invention is not, however, intended to be limited to the specific aspects presented above, which have been presented for purposes of illustration. Rather, the invention extends to functional equivalents as would be within the scope of the appended claims. Those skilled in the art, having the benefit of the teachings of this specification, may make numerous modifications without departing from the scope and spirit of the invention in its various aspects.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for managing messages of a message batch in a supply chain process having a plurality of players, including customers and suppliers, the method comprising:
   (a) receiving a message from a customer of the supply chain at a central server, the message being sent from an enterprise messaging system of the customer to an enterprise messaging system of a supplier,
      wherein the message includes an intersection data element that is part of the message, the intersection data element being one of an order number, a sales order number, a delivery note number, a shipping number, a transaction number, a line number, a tracking number, or an invoice number, and
      wherein the message from the enterprise messaging system of the customer is received at the central server as part of a message batch from the customer;
   (b) binding the message received from the customer at the central server according to one or more binding rules selected from a rule set, the binding rules defining data elements of the customer, the supplier, and the message from the customer, including the intersection data element that is part of the message, wherein the message, including the intersection data element, is a required data element of the binding rules;
   (c) building a binding message set based on the data elements of the binding rules of step (b), wherein the binding message set includes all messages that are intersected together; and
   (d) retrieving messages based on the binding message set of step (c).

2. The method of claim 1, wherein the binding of step (b) comprises binding the message with related messages existing in the supply chain.

3. The method of claim 2, wherein the binding the message with related messages comprises searching for the one or more binding rules based on at least one of the customer and the supplier, a common data element, a type of the received message or a combination thereof.

4. The method of claim 2, wherein the binding the message with related messages comprises searching for the one or more binding rules based on various corresponding intersection data elements.

5. The method of claim 1, wherein the binding of step (b) comprises eliminating duplicate messages from the binding message set of step (c).

6. The method of claim 1, wherein the binding of step (b) comprises validating a message binding based on an existence of another message included in the message binding.

7. The method of claim 1, wherein the building the binding message set of step (c) comprises constructing the binding message set based on message bindings between at least the customer and the supplier.

8. The method of claim 1, wherein the building the binding message set of step (c) comprises combining message bindings.

9. The method of claim 8, wherein the combining the message bindings comprises performing union operations against message bindings existing in the supply chain.

10. The method of claim 1, wherein the retrieving the messages of step (d) comprises retrieving the messages selected from the binding message set.

11. The method of claim 1, further comprising the steps of:
   (e) receiving a message from an enterprise messaging system of a shipper in the supply chain process; and
   (f) analyzing properties of the message from the shipper and the shipper to determine whether to bind the message from the shipper with the binding message set.

12. The method of claim 11, further comprising the steps of:
   (g) receiving a request from an enterprise messaging system of a carrier of the supply chain process for messages conforming to one or more desired data elements;
   (h) analyzing the binding message set to determine whether the messages therein conform to the desired data elements; and
   (i) sending to the enterprise messaging system of the carrier the binding message set when the messages therein conform to the desired data elements.

13. The method of claim 1, wherein the message from the enterprise messaging system of the customer is received into an inbound messaging queue of the central server.

14. The method of claim 1, wherein the message has a message type, and the intersection data element is dependent upon a message type.

15. The method of claim 1, further comprising:
   displaying the binding message set to the customer, the binding message set including an order create and an order response.

16. The method of claim 1, wherein the central server is comprised of computing devices for providing functional services to the plurality of players.

17. The method of claim 1, wherein the message sent from the customer to the supplier follows a predetermined framework generated between the customer and the supplier.

18. A method for managing messages of a message batch in a supply chain process having a plurality of players, the supply chain process including a terminal and a central server, the method comprising:
   (a) receiving a message from a customer of the supply chain using the central server, the message being sent from an enterprise messaging system of the customer to an enterprise messaging system of a supplier through the central server,
      wherein the message includes an intersection data element that is part of the message, the intersection data element being one of an order number, a sales order number, a delivery note number, a shipping number, a transaction number, a line number, a tracking number, or an invoice number, and
      wherein the message from the enterprise messaging system of the customer is received at the central server as part of a message batch from the customer;
   (b) binding the message received from the customer according to one or more binding rules selected from a rule set, the binding rules defining data elements of the customer, the supplier, and the message from the customer, including the intersection data element that is part of the message, wherein the message, including the intersection data element, is a required data element of the binding rules;
   (c) building a binding message set based on the data elements of the binding rules of step (b) in the central server, wherein the binding message set includes all messages that are intersected together;
   (d) sending messages from the central server based on the binding message set of step (c); and
   (e) retrieving the messages of step (d) with the terminal.

19. The method of claim 18, wherein the central server is configured to bind the message from the customer with related messages existing in the supply chain.

20. The method of claim 19, wherein the binding the message with related messages existing in the supply chain comprises searching for the one or more binding rules based on at least one of the customer and the supplier, a common data element, a type of the received message, or a combination thereof.

21. The method of claim 19, wherein the binding the message with related messages existing in the supply chain comprises searching for the one or more binding rules based on various corresponding intersection data elements.

22. The method of claim 18, wherein the central server is configured to eliminate duplicate messages from the binding message set of step (c).

23. The method of claim 18, wherein the central server is configured to validate the binding message set of step (c) based on an existence of another message included in a message binding.

24. The method of claim 18, wherein the central server is configured to perform a union operation against related message bindings existing in the supply chain for constructing the binding message set of step (c) and to select the messages from the binding message of step (c) for displaying on the terminal in step (d).

25. The method of claim 18, wherein the central server is comprised of computing devices for providing functional services to the plurality of players.

26. The method of claim 18, wherein the message sent from the customer to the supplier follows a predetermined framework generated between the customer and the supplier.

* * * * *